Figure 1:
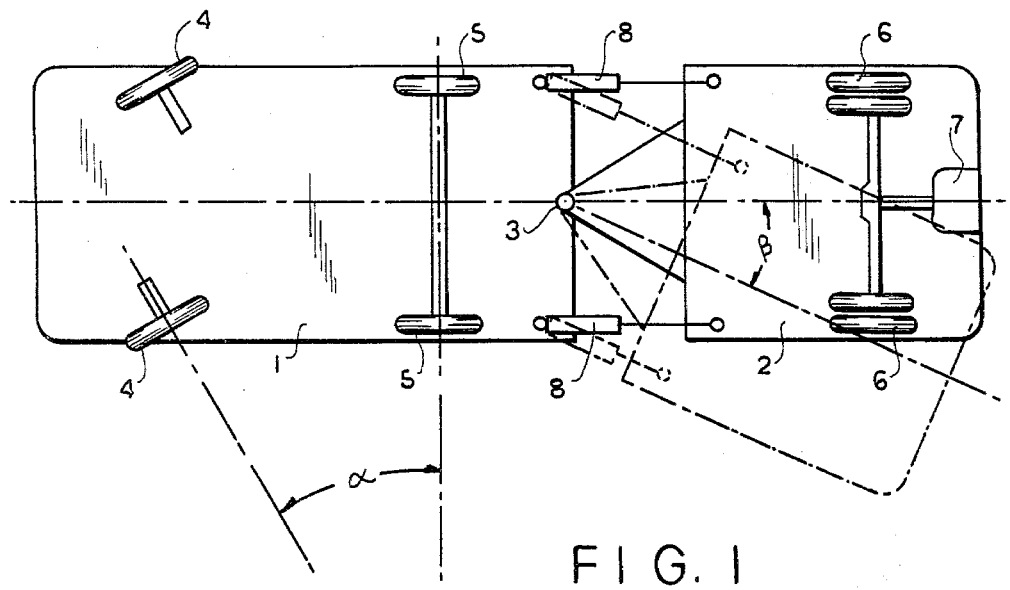

United States Patent [19]

Moll

[11] 4,351,408

[45] Sep. 28, 1982

[54] ARTICULATED VEHICLE

[75] Inventor: Hans Moll, Augsburg, Fed. Rep. of Germany

[73] Assignee: MAN Maschinenfabrik Augsburg-Nurnberg AG, Munich, Fed. Rep. of Germany

[21] Appl. No.: 99,441

[22] Filed: Dec. 3, 1979

[30] Foreign Application Priority Data

Dec. 5, 1978 [DE] Fed. Rep. of Germany ....... 2852613

[51] Int. Cl.$^3$ ............................................ B62D 53/000
[52] U.S. Cl. .................................... 180/135; 280/426
[58] Field of Search ................ 180/6.24, 22, 135, 141, 180/139, 79, 131; 280/426, 442, 400, 432

[56] References Cited

U.S. PATENT DOCUMENTS

| 2,833,557 | 5/1958 | Palmiter | 180/139 |
|---|---|---|---|
| 3,515,235 | 6/1970 | Kamner | 180/135 |
| 3,771,241 | 11/1973 | Lindell | 180/135 |
| 3,834,480 | 9/1974 | McGee | 180/135 |
| 4,106,792 | 8/1978 | Schultz et al. | 280/432 |

FOREIGN PATENT DOCUMENTS

| 1806699 | 6/1969 | Fed. Rep. of Germany | 180/131 |
|---|---|---|---|
| 2547487 | 4/1977 | Fed. Rep. of Germany | |
| 1202490 | 8/1970 | United Kingdom | 180/131 |

Primary Examiner—Joseph F. Peters, Jr.
Assistant Examiner—Mitchell J. Hill
Attorney, Agent, or Firm—Alan H. Levine

[57] ABSTRACT

An articulated vehicle including a front member having at least two axles, the forwardmost one of which is steerable, and a rear member, connected to the front member by a pivotal joint, having at least one axle and an engine for driving that axle. A first transducer produces a signal representative of the angle between the steerable axle and another axle of the front member, and a second transducer produces a signal representative of the buckling angle between the vehicle members. A comparator receives the transducer signals and produces a signal in the event that the actual buckling angle is less or greater than a theoretical buckling angle, the latter being determined by the signal from the first transducer. A device, such as a piston and cylinder device, responds to the comparator signal by producing a torque about the pivotal joint to increase or decrease, as the case may be, the actual buckling angle so that it approaches the theoretical buckling angle.

2 Claims, 2 Drawing Figures

ARTICULATED VEHICLE

This invention relates to a vehicle, and more particularly to an articulated omnibus comprising a front member having front and rear axles, the front axle being steerable, and a rear member connected to the front member by means of a joint. The rear member has at least one axle driven by an engine arranged in the rear member of the vehicle. A transducer is provided to sense the steering angle existing between the front axle and the rear axle of the front member of the vehicle, and another transducer senses the buckling angle present between the longitudinal centerline of the front member and the longitudinal centerline of the rear member of the vehicle. Comparator circuitry receives the signals from the two transducers and produces a signal when the buckling angle exceeds a theoretical value representing a function of the steering angle or the behavior of the front member of the vehicle. A means responds to the signal from the comparator circuitry to produce a torque about the vertical axis of the joint serving to alter the buckling angle to the theoretical buckling angle.

Such a vehicle has been described in German Printed Patent Application No. 25 47 487 (published Apr. 28, 1977). With this known vehicle, unequal braking of the live wheels in the rear member of the vehicle is used to produce a torque about the vertical axis of the joint to correct the buckling angle in a direction decreasing it when it exceeds the theoretical value. The known vehicle has a disadvantage in that the torque for correcting the buckling angle can be exerted only if the grip of the unequally braked wheels on the road is sufficiently strong. A further disadvantage of the known vehicle is that it does not prevent the rear member of the vehicle from skidding within the allowable range of the buckling angle, because the torque to correct the buckling angle is generated only when the buckling angle exceeds the allowable value.

It is a general object of the present invention to provide a vehicle of the category described wherein the torque to correct the buckling angle is produced independently of the grip of the wheels on the road, and wherein by eliminating the other disadvantages of the known vehicle the vehicle can be handled more safely.

It is a particular object of the present invention to provide an arrangement wherein the comparator circuitry produces a signal to actuate the responsive means when the buckling angle is smaller, as well as larger, than the respective theoretical value as determined by the steering angle, wherein the torque about the vertical axis acts is a direction increasing the buckling angle, and wherein the responsive means includes a thrust piston and cylinder assembly, the piston being connected to the front member of the vehicle and the cylinder to the rear member of the vehicle, or vice versa.

Accordingly, with the vehicle of the present invention the tendency will invariably be to restore the proper buckling angle between the two members of the vehicle, because a torque is produced in both the direction reducing the buckling angle as well as that increasing it, depending upon whether the actual buckling angle is larger or smaller than the theoretical value.

In a preferred embodiment of the present invention, use is made of a pneumatically-operated thrust piston and cylinder assembly. Owing to the compressibility of the air in the piston and cylinder assembly, a balance can be struck between the theoretical buckling angle and the deviation dictated by rough or varying conditions of the roadway, with the vehicle nevertheless invariably tending to restore the proper buckling angle. The same effect can be achieved with a hydraulically-operated thrust piston and cylinder assembly used in connection with a loaded spring.

In a further embodiment of the present invention, a thrust piston and cylinder assembly is arranged on either side of the joint.

Figure 2:
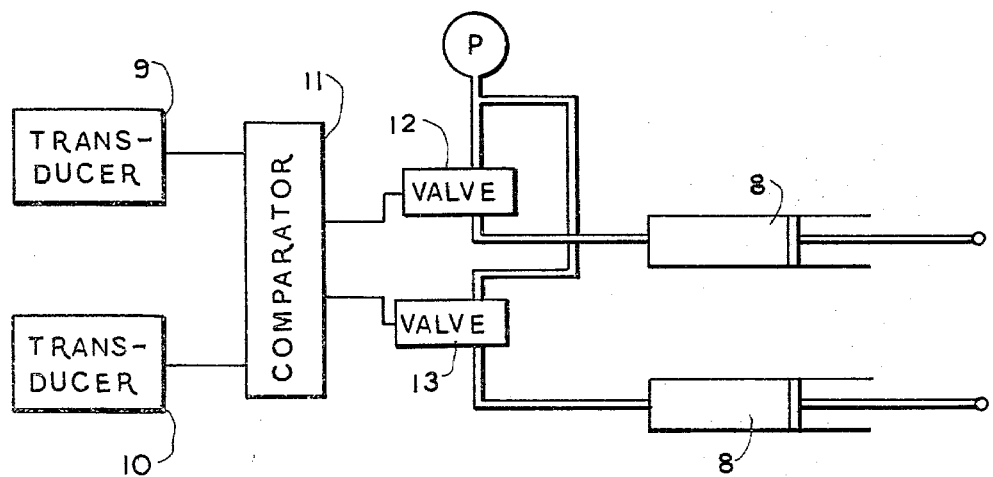

The invention is described more fully below with reference to an embodiment illustrated on the accompanying drawings, in which:

FIG. 1 is a plan view schematically illustrating an articulated bus according to the present invention; and FIG. 2 a schematic arrangement of a control unit including transducers and comparator circuitry.

An articulated bus according to the present invention comprises a front or leading member 1, and a rear or trailing member 2 connected to the leading member 1 by means of a joint 3. At its front end, the leading member 1 has a pair of steerable wheels 4 and at its rear end, a pair of nonsteerable wheels 5. The trailing member 2 is supported on a single axle. The wheels 6 of the trailing member are driven by an engine 7 arranged at the rear end of the trailing member. When the articulated bus is traveling forwardly, the front member 1 is pushed by the trailing member 2 of the vehicle.

In accordance with the present invention, a pneumatically-operated piston and cylinder assembly 8 is arranged on either side of the joint 3. The cylinders of the two piston and cylinder assemblies 8 are hinged to the leading member 1 of the vehicle and their pistons are hinged to the trailing member 2 of the vehicle.

The two piston and cylinder assemblies 8 are energized via a control unit shown schematically in FIG. 2.

A transducer 9 for sensing the steering angle $\alpha$ and a transducer 10 for sensing the buckling angle $\beta$ are connected to a comparator circuitry 11. The transducer 9 generates a signal corresponding to the steering angle $\alpha$ which is applied to the comparator circuitry 11, of generally conventional design, similar to that described in the above-identified German published application. The transducer 10 generates a signal corresponding to the existing buckling angle $\beta$, and this signal is also applied to the comparator circuitry. In the comparator circuitry 11, a theoretical value of the buckling angle $\beta$ is determined at any given moment, by the steering angle $\alpha$. The signal corresponding to the existing buckling angle $\beta$ is compared with the theoretical value of the buckling angle $\beta$ in the comparator. When the actual buckling angle $\beta$ exceeds the allowable buckling angle, the comparator circuitry 11 produces two signals to actuate valves 12 and 13 for different lengths of time. Owing to the non-uniform actuation of the valves 12 and 13, a source of pressure P communicates with the pneumatically operated cylinders 8 for different lengths of time. As a result, different levels of pressure are built up in the pneumatically operated cylinders 8 such that a torque is created about the vertical axis of the joint 3 in a direction reducing the buckling angle. The unequal pressurization and, thus application of torque, continues until the actual buckling angle corresponds to the theoretical buckling angle. At that time, the valves 12 and 13 are closed to equalize the pressure in the two piston and cylinder assemblies 8.

When the existing buckling angle is less than the theoretical value, the pistons of the piston and cylinder assemblies 8 are energized unequally, so that the torque is brought to bear in a direction increasing the buckling angle, until the actual buckling angle changes to the theoretical value.

The unequal pressures in the cylinders are selected such as to keep the torque from growing to a point where at the time the wheels 5 are normally gripping the road, the wheels 5 will begin to slip.

The theoretical buckling angle is a linear function of the steering angle, this function to be determined experimentally.

For the comparator circuitry 11, use can be made of microprocessors.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An articulated vehicle comprising:
   (a) a front member having at least two axles, the forwardmost axle being steerable,
   (b) a rear member, connected to the front member by a pivotal joint, having at least one axle and an engine for driving that axle,
   (c) a first transducer for producing a signal representative of the angle between the steerable axle and another non-steerable axle of the front member,
   (d) a second transducer for producing a signal representative of the buckling angle between the longitudinal centerlines of the front and rear members,
   (e) comparator means for receiving the signals from the transducers and for producing a signal in the event that the actual buckling angle between the vehicle members is less or greater than a theoretical buckling angle, the theoretical buckling angle being determined by the signal from the first transducer,
   (f) two pneumatic piston and cylinder assemblies pivotally connected between the two vehicle members, the piston and cylinder assemblies being located one on each side of the pivotal joint and being responsive to the signal from the comparator for producing a torque about the pivotal joint to increase or decrease, as the case may be, the actual buckling angle between the vehicle members so that it approaches the theoretical buckling angle, and
   (g) a resilient pneumatic fluid within each piston and cylinder assembly for permitting variations between the theoretical and actual buckling angles, caused by roadway conditions, while constantly urging the actual buckling angle toward the theoretical buckling angle.

2. An articulated vehicle as defined in claim 1 wherein the comparator includes a microprocessor.

* * * * *